(12) United States Patent
Gurin

(10) Patent No.: US 9,098,866 B1
(45) Date of Patent: Aug. 4, 2015

(54) DYNAMIC PERSONALIZATION PROFILE

(71) Applicant: Michael Gurin, Glenview, IL (US)

(72) Inventor: Michael Gurin, Glenview, IL (US)

( * ) Notice: Subject to any disclaimer, the term of this patent is extended or adjusted under 35 U.S.C. 154(b) by 236 days.

(21) Appl. No.: 13/669,827

(22) Filed: Nov. 6, 2012

Related U.S. Application Data

(60) Provisional application No. 61/557,533, filed on Nov. 9, 2011.

(51) Int. Cl.
G06N 5/00 (2006.01)
G06F 1/00 (2006.01)
G06Q 30/02 (2012.01)

(52) U.S. Cl.
CPC .................................. G06Q 30/0256 (2013.01)

(58) Field of Classification Search
CPC ......... G06N 5/02; G06Q 10/10; G06Q 10/06; G06F 17/00
See application file for complete search history.

(56) References Cited

U.S. PATENT DOCUMENTS

2010/0201505 A1* 8/2010 Honary et al. ............. 340/425.5
2011/0306028 A1* 12/2011 Galimore ..................... 434/322
2014/0052576 A1* 2/2014 Zelenka et al. ........... 705/26.41

* cited by examiner

Primary Examiner — Jeffrey A Gaffin
Assistant Examiner — Kalpana Bharadwaj

(57) ABSTRACT

The present invention generally relates to utilization of at least two known location addresses yielding accurate determination of a user's mode of operations and/or preferences. In one embodiment, the present invention utilizes proximity and/or vector between a current location address and a known home or work address to determine preferences that dynamically change based on the current location and inter-relationship between the current location and at least one other known location address.

20 Claims, 6 Drawing Sheets

Scenario A

Scenario B

Scenario A

Scenario B

DYNAMIC PERSONALIZATION PROFILE

FIELD OF THE INVENTION

The present invention generally relates to enabling high targeted and precise decisions, in which decision engines have accurate user profiles that dynamically change as a function of numerous parameters including location, additional co-located people, and time-of-day. In all embodiments, the present invention utilizes at least one dynamic profile consisting of at least two dynamic parameters in addition to the specific user.

BACKGROUND OF THE INVENTION

User personalization has an important impact on a wide range of activities from travel time, food selection, to targeted messaging. The ability to improve the accuracy of decision engines is largely dependent on the ability to characterize the end user accurately.

Traditional decision engines utilize static user profiles with often large amounts of parametric data as a means of increasing accuracy of decision engines.

Prior art of US Patent Pending 20100004997 is based on an unknown user profile, and uses location including the attempted distinction between a work and home location to determine an anticipated user profile.

The invention being described utilizes a known user profile to dynamically change the mode and thus the sub-segment of the user to more accurately create context for the specific activity and/or location in which the user (again having a known user profile, i.e., gender, age, etc.) is engaged in. Furthermore, the invention recognizes that a specific user having a known user profile engages in a wide range of activities that have fundamentally different behaviors and characteristics that range from limited to a complete absence of similarities to the known user profile.

The combined limitations of static user profiles and large amounts of parametric data leads to inaccuracies and complex interaction with decision engines requiring longer processing times and/or more powerful processors.

SUMMARY OF THE INVENTION

The present invention preferred embodiment relates to dynamic user profiles that both use known contextual relevance to increase the accuracy of decision engines yielding enhanced predicted contextual relevance. The utilization of a dynamic personalization engine with a tightly coupled decision support engine has distinct advantages yielding increased accuracy for a wide range of user activities.

The dynamic personalization profile engine enables superior predictions reducing erroneous user interaction, misguided communications, and excessively large options presented to the user in arriving at a precise and accurate decision. Furthermore, the dynamic personalization profile enables the user to utilize a significantly less powerful and smaller interactive device to greatly reduce the cost of such interactive device.

DETAILED DESCRIPTION OF THE INVENTION

Figure 1:
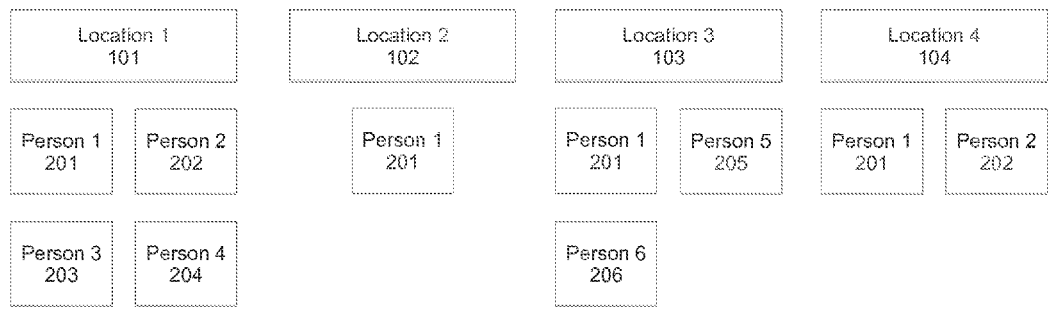
FIG. 1 is a diagram of two embodiments of locations having people to create context in accordance with the present invention.
Figure 1:
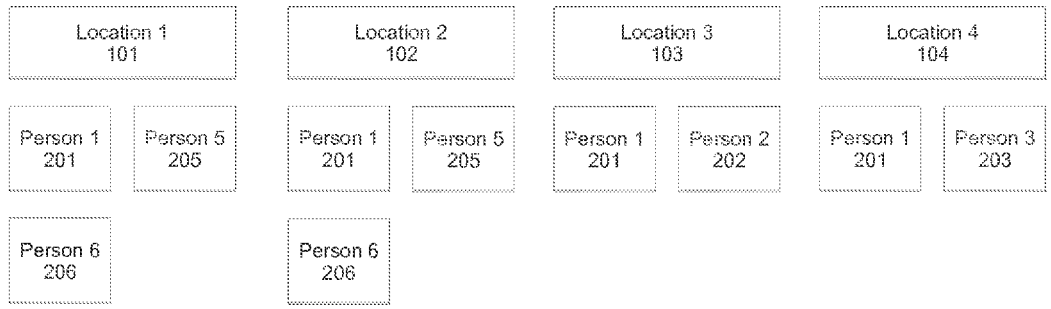

The term "work", as used herein, generally includes location in which an occupation is conducted ranging from traditional office, factory, or retail store to less traditional hot-desking or hoteling to hangouts such as coffee houses, libraries, or shared office venues.

The term "home", as used herein, generally includes location in which an individual lives (e.g., sleeps, eats, etc.) whether alone or with roommates or family.

The term "zone", as used herein, includes an area around a specific location such as a geofence providing either a 2D or even 3D space defined by a non-linear X,Y or X,Y,Z coordinate physical space.

The term "function", as used herein, includes activities conducted by a person. The function is preferably categorized by a range of categories including work, family, exercise, entertainment, food (i.e., eating). It is understood that an activity can fall into more than one category concurrently.

The term "m-function", as used herein and distinguishes from the aforementioned function, includes a mathematical representation to parameterize a series of parameters represented by either numerical values or linear to non-linear formulas.

The term "mode", as used herein, is a categorization of functions into a range of defined operating roles. Modes are the preferred method to select amongst individual sub-profiles on a dynamic basis.

Here, as well as elsewhere in the specification and claims, individual numerical values and/or individual range limits can be combined to form non-disclosed ranges.

Exemplary embodiments of the present invention will now be discussed with reference to the attached Figures. Such embodiments are merely exemplary in nature. Furthermore, it is understood as known in the art that object oriented data structures use parent and child inter-relationships between object types. The utilization of object oriented databases within a decision engine can alternatively utilize relational databases with known inter-relationships and preferably with a database having the best features of both object and relational databases in one integrated database. With regard to FIGS. 1 through 5, like reference numerals refer to like parts.

It is understood that virtually every embodiment of this invention can include the inventive dynamic personal profiles to increase the effectiveness of virtually any hardware or software application to make better decisions while minimizing user input.

Every configuration and embodiment has at least one hardware device operating at least one software application to operate the decision engine(s) and to obtain optimal contextual relevance using minimal user hardware capabilities with minimized user interaction.

Turning to FIG. 1, FIG. 1 is a diagram of multiple embodiments in which the combination of a current location and a known first user personalization profile, such that the personalization profile has at least one other location associated with the first user personalization profile. The instances in Scenario A are exemplary where Person 1 201 is a parent having a spouse Person 2 202 and both have children Person 3 203 and Person 4 204. Person 5 205 is a co-worker of Person 1 201, as well as Person 6 206 is another co-worker of Person 1 201 as well as Person 5 205. In this instance Location 1 101 is Person 1 201 home, Location 2 102 is a location that is in proximity to work that is Location 3 103. Location 4 104 is a location that is in proximity to Person 1 201 home. The dynamic personalization engine has the ability to approximate a mode probability through the combination of distance between known locations (i.e., addresses) of home and/or work of a first user (i.e., Person 1 201), co-location of fellow co-workers (i.e., Person 5 205 and/or Person 6 206), co-location of family members (i.e., Person 2 202, Person 3 203, and/or Person 4 204).

Numerous instances exist, including when a place of work is in close proximity to home, such that location is not adequate to determine the mode for the first user. The use of co-located people is a significant weighting factor to determine whether or not the mode is work or personal, such as co-locating with co-worker increases the probability of the mode being work, or such as co-locating with family member increases the probability of the mode being personal. Additionally, the frequency of such occurrence (particularly when related to work) has the ability to further differentiate as one such example between a normal personal lunch during work and an entertainment (i.e., client lunch) lunch where the expense of this meal is considered a business expense. It is understood that a user's purchasing habits (i.e., propensity for expensive or additional items) are largely influenced by who is fiscally responsible for such activity. One instance where location is important for enhancing a decision engine's performance Is distance between a current location and the first user's known home address. A distance that is at least 10 miles, or preferably at least 5 miles, or particularly preferred at least 2 miles between the current location and the first user's home address (or at least 4 blocks when in a high urban density area, particularly when the first user is void of public transportation, taxi, or other vehicle) is indicative of the likelihood to purchase products for use within the home. The likelihood of purchasing a perishable product rapidly approaches zero as the distance increases beyond a user specified (or historical basis to determine such a perishable range) distance from home. The likelihood of purchasing a non-perishable product also rapidly approaches zero as the distance increases beyond a user specified (or historical basis to determine such a weight range or volume range) distance from home.

The further combination of time-of-day increases the accuracy of determining user mode. It is further understood that the presence in a location outside of a zone around a known work address and outside of a zone around a known home address during normal work hours has increasing probability of being a work related mode. More particularly during normal work hours, it has increasing probability of being not only work related but work entertainment related. A work entertainment mode increases the decision engine to make selections based on the preference of a second user co-locating when a known scheduled event is provided or anticipated.

Scenario B are embodiments, as distinguished between Scenario A, when time-of-day is taken into account. In this instance, even though Location 1 101 is in proximity to Person 1 101 known home address, the occurrence during normal work hours and the co-locating with co-workers Person 5 205 and Person 6 206, greatly increases the probability of the first user mode being a work related mode. In the event that the proximity of the Location 1 101 (or more particularly a zone around the known home address) is distant from the known work address and as shown co-locating are co-workers, than the mode is both likely to be a work related mode and further an increased probability of the mode being work entertainment (i.e., increased probability of fiscal responsibility being work expense). Location 2 102 during normal business hours with co-location of Person 1 201 and co-workers Person 5 205 and Person 6 206 is likely to be work mode, but likely to be work lunch being fiscal responsibility of individual workers. Location 2 102, though not depicted with co-location of Person 3 203 and/or Person 4 204 during normal hours would be personal mode even though it is in close proximity of Person 1 201 work address. Location 3 103 with co-locating of Person 1 201 and Person 2 202 during a weekend evening is likely to be a "date" night to distinguish between a family outing where co-locating is Person 3 203 and/or Person 4 204 such as indicated for Location 4 104.

Figure 2:
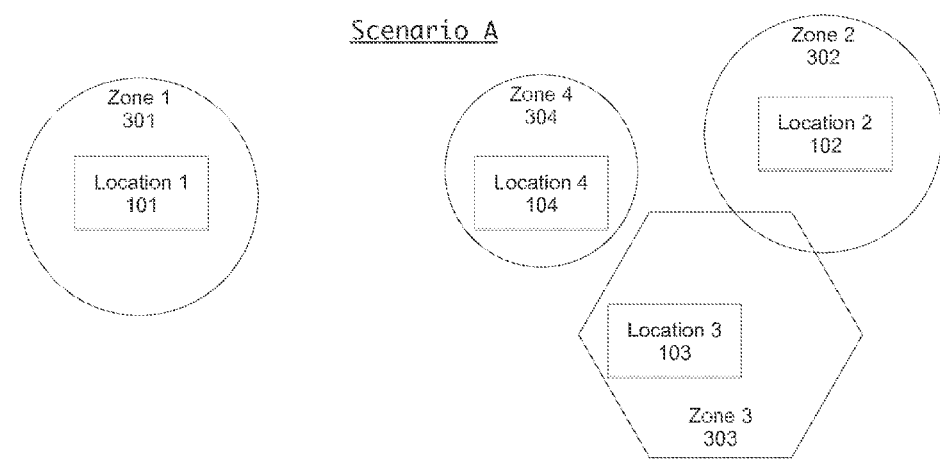
FIG. 2 is a diagram of another two embodiments of location within geographic zones in accordance with the present invention.
Figure 2:
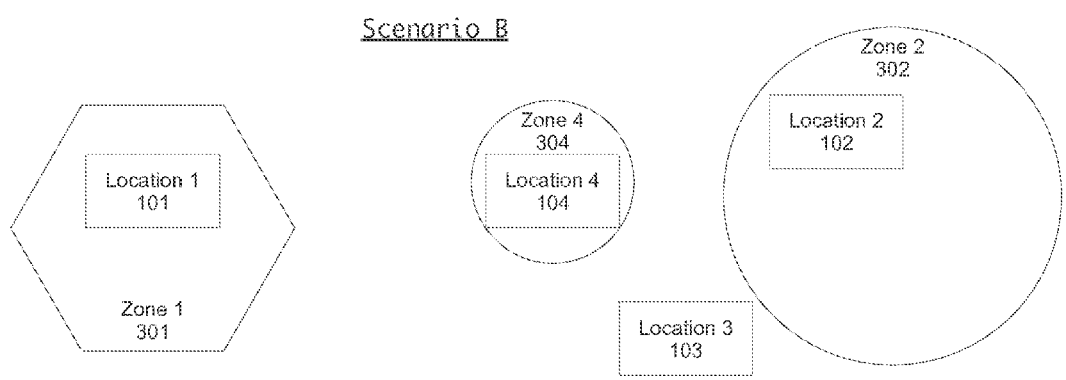

Turning to FIG. 2, FIG. 2 is a diagram of further embodiments for locations under two different time domain representations respectively Scenario A for a first time slot and Scenario B for a second time slot. FIG. 2 Scenario A depicts individual locations Location 1 101, Location 2 102, Location 3 103, and Location 4 104 each having a zone respectively Zone 1 301, Zone 2 302, Zone 3 303, and Zone 4 304 where each zone encompasses the location. It is recognized that a zone can range from a simple shape such as a circle or hexagon (both as depicted) to a non-linear 2 dimensional or even 3 dimensional non-linear shape, or as known in the art can be any defined geofence having a relative position to a 2D or 3D coordinate system to define the location. Scenario B depicts that at least one time domain can exist in which the zone can change size such as Zone 4 304 for Location 4 104 between Scenario A and Scenario B. Scenario B depicts a change in both size and relative position of the zone to the encompassed location such as Zone 2 302 for Location 2 102. Scenario B depicts Zone 1 for Location 1 with respect to Scenario A both a change in size and shape for the zone. It is also understood that a defined and known home address and/or work address location can also change in the time domain (i.e., seasonal change, time-of-day change, day of week change, holiday, etc.). It is further understood that a zone can depict either a geographic area to be included for consideration within the decision engine, or excluded for consideration within the decision engine.

Figure 3:
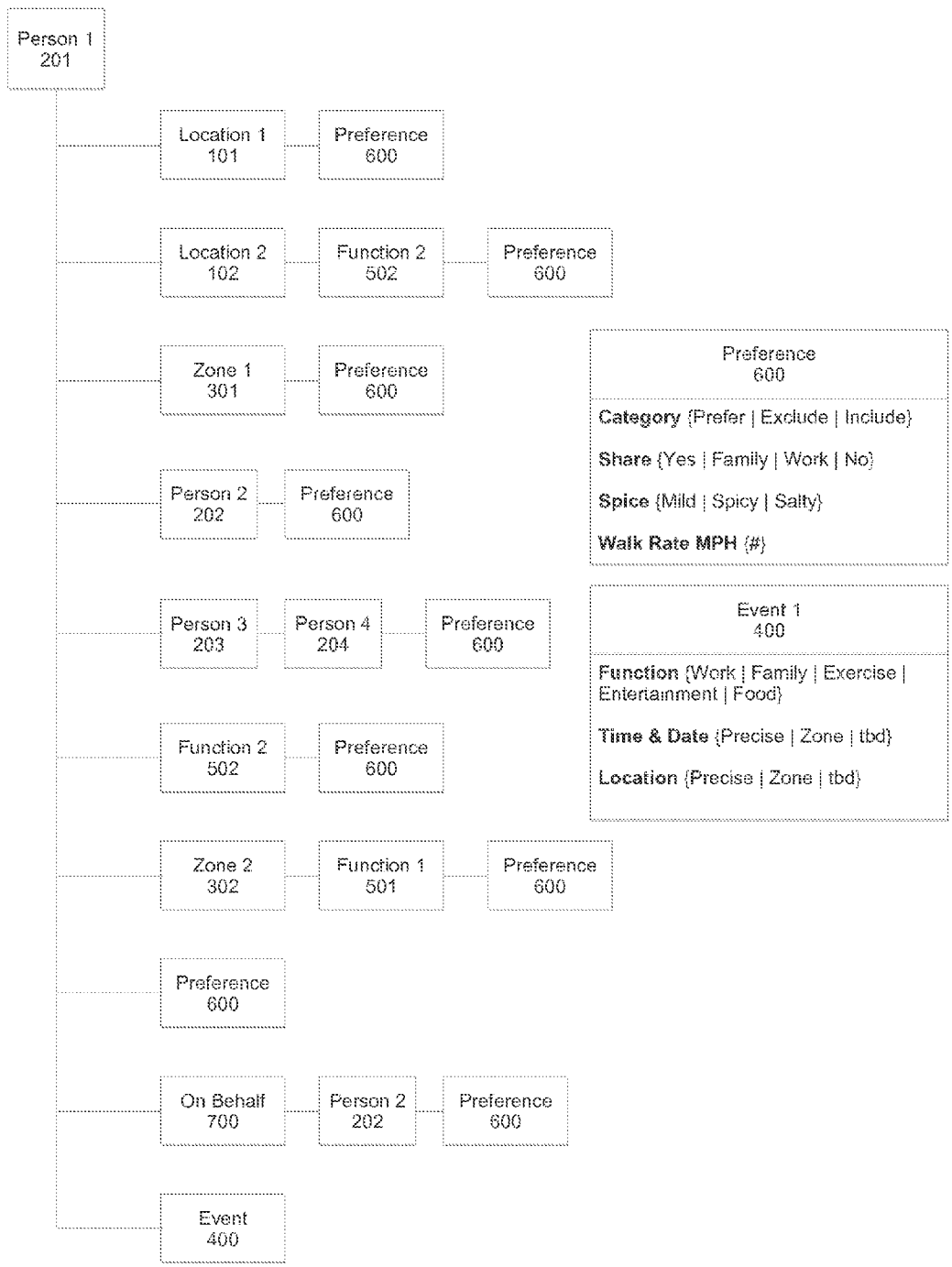
FIG. 3 is diagram of an object class data structure for preference determination in accordance with the present invention.

Turning to FIG. 3, FIG. 3 is a data object diagram depicting a set of child relationships creating representative relationships between the first user personalization profile Person 1 201. It is understood that at least one, though not everyone, of the depicted child relationships has to exist in actuality and furthermore, it is understood that a child relationship can become inactive as a function of the time domain or conditional on any individual parameter to a non-linear formula for a series of parameters. It is also understood that the child object class type and instance are both fundamentally important as the decision engine maneuvers through the data structure to ensure more accurate context in creating interaction with the first user whether the decision engine is determining first user preference. It is further understood that a location address, such as depicted earlier for Location 1 101 being the first user's home address, is preferably a distinct object class type of home address. It is also further understood that a location address, such as depicted earlier for Location 3 103 being the first user's work address, is preferably a distinct object class type of work address. It is further understood that a location zone, such as depicted earlier for Zone 1 301 being the first user's home zone, is preferably a distinct object class type of home zone. It is also further understood that a location zone, such as depicted earlier for Zone 3 303 being the first user's work zone, is preferably a distinct object class type of work zone. It is also understood that a function object class type includes function types for activities including Work, Family, Exercise, Entertainment, Food at a minimum with the option of additional user-defined function types or system designer defined function types. The data structure is characterized beginning from the first (top) child object to the last (bottom) child object as follows: 1) Location 1 101>>Preference 600 when Location 1 101 is either instance of home or type of home provides preference(s) which can be a range of parameters including Category having values including Prefer, Exclude or Include, Share having values including Yes, Family, Work, or No, Spice (such as for food preferences) including Mild, Spicy, or Salty, or Walk Rate MPH as a numeric parameter; 2) Location 2 102>>Function 2 502>>Preference 600 is for a specific location (not specifically a home address or work address) and for a specific function recognizing that certain locations can be multifunctional (i.e., shopping in a mall, exercise walking in a mall, etc.); 3) Zone 1 301>>Preference 600 is for a specific geofence around the first user's home address as Zone 1 301 is either a specific zone home type or an instance having a zone identifier of home; 4) Person 2 202>>Preference 600 is for preferences when the first user is co-located with Person 2 202 (i.e., spouse); 5) Person 3 203>>Person 4 204>>Preference 600 is for preferences when both Person 3 203 and Person 4 204 (i.e., children) are co-located with first user (it is understood that when preferences are not indicated for both/all co-located persons, the preferences are selected for the instance having at least one of the co-located persons); 6) Function 2 502>>Preference 600 is for when a particular activity is being performed; 7) Zone 2 302>>Function 1 501>>Preference 600 is for when the first user is within the specified zone having either the same zone class type (such as for specific home or work zones, or for zones with the indicated zone identifier); 8) Preference 600 is essentially default preferences when no child objects exist for known locations, zones, functions, or co-located persons; 9) On Behalf 700>>Person 2 202>>Preference 600 is reserved for activities that are done by first user but where the activity is fundamentally being done on behalf of another person (i.e., Person 2 202—spouse, therefore a favor for someone else or a purchase of a gift for someone else) such that the performance of the activity does not fundamentally alter the first user's preferences but rather provide insight/purpose to the activity; or 10) Event 400 such that preferences are specific to certain types of events (e.g., birthday, anniversary, religious events, etc. In either 9) or 10) it is understood that the activity is based around preferences often independent of first user but rather in 9) for person potentially co-located or in 10) for a person potentially in which the event is celebrating or on behalf.

Figure 4:
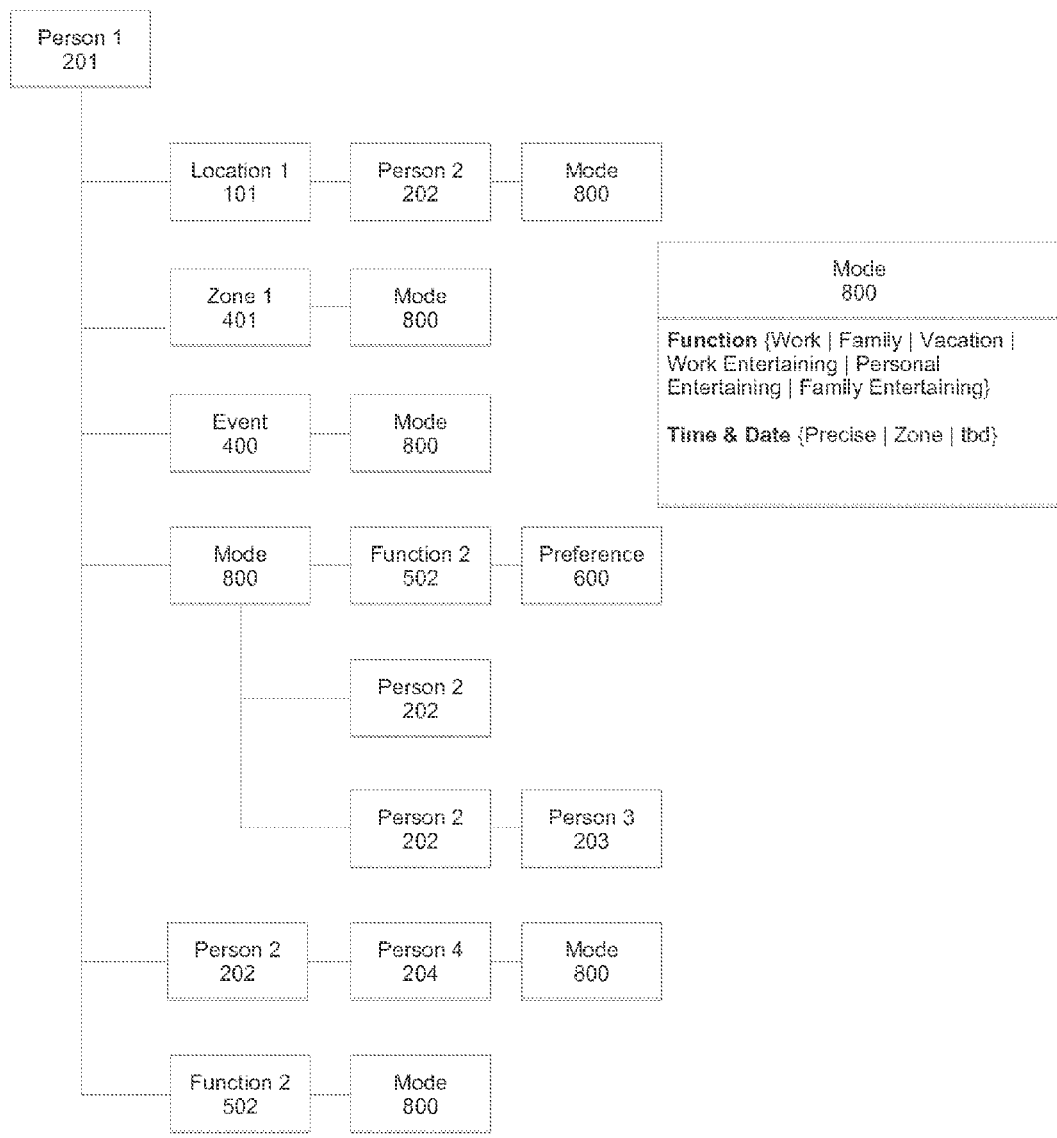
FIG. 4 is diagram of an object class data structure for mode determination in accordance with the present invention.

Turning to FIG. 4, FIG. 4 is a data object diagram depicting a set of child relationships creating representative relationships between the first user personalization profile Person 1 201. It is understood that at least one, though not everyone, of the depicted child relationships has to exist in actuality and furthermore, it is understood that a child relationship can become inactive as a function of the time domain or conditional on any individual parameter to a non-linear formula for a series of parameters. It is also understood that the child object class type and instance are both fundamentally important as the decision engine maneuvers through the data structure to ensure more accurate context in creating interaction with the first user when the decision engine is determining first user mode and potentially preferences specific to instances for the indicated first user mode. It is understood that in the absence of a pre-determined or known mode various other known object instances or parameters enable the decision engine to anticipate and/or statistically represent a probability (based on either historical data or rules based assessment) that the first user Person 1 201 is currently operating in a specific Mode instance. The data structure is characterized beginning from the first (top) child object to the last (bottom) child object as follows: 1) Location 1 101>>Person 2 202>>Mode 800 is such that the combination of being at home location with spouse establishes an instance of Mode (in this example being Family); 2) Zone 1 401>>Mode 800 such that an instance of Mode (in this example being a mode within the subset of personal modes, such as Family or Family Entertaining particularly the latter when the current location of first user is such as a restaurant, movie theater or the like); 3) Event 400>>Mode 800 such that an instance of events with one exemplary of birthday or anniversary (in this example being a mode within the subset of personal modes, such as Family or Family Entertaining particularly the latter when the current location of first user is such as a restaurant, movie theater or the like); 4a) Mode 800>>Function 2 502>>Preference 600 is such that a known mode instance is already determined/established and then when a known function activity is known the combination yields particular preferences; 4b) Mode 800>>Person 2 202 such that a known mode instance in combination with co-located with Person 2 202 establishes preferences specific as indicated by child objects of the type class Preference; 4c) Mode 800>>Person 2 202>>Person 3 203 such that the combination of both co-located persons when an instance of mode is established; 5) Person 2 202>>Person 4 204>>Mode 800 is such that the presence of co-located Person 2 and Person 4 establish the mode instance for Person 1 201; 6) Function 2 502>>Mode 800 establish the mode instance for Person 1 201 when the first user Person 1 is conducting the function activity for the instance object type and/or identifier of the object of function class. Function and Time of Date parameters for the object type Mode are effectively similar or identical to parameters for the object type Preference.

Figure 5:
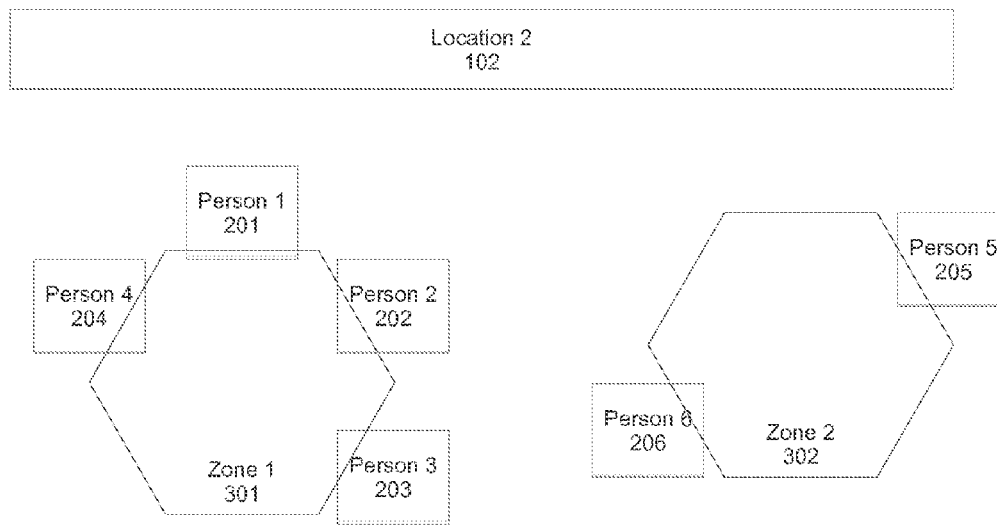
FIG. 5 is diagram of two embodiments of location having zones and people within zones to create context in accordance with the present invention.
Figure 5:
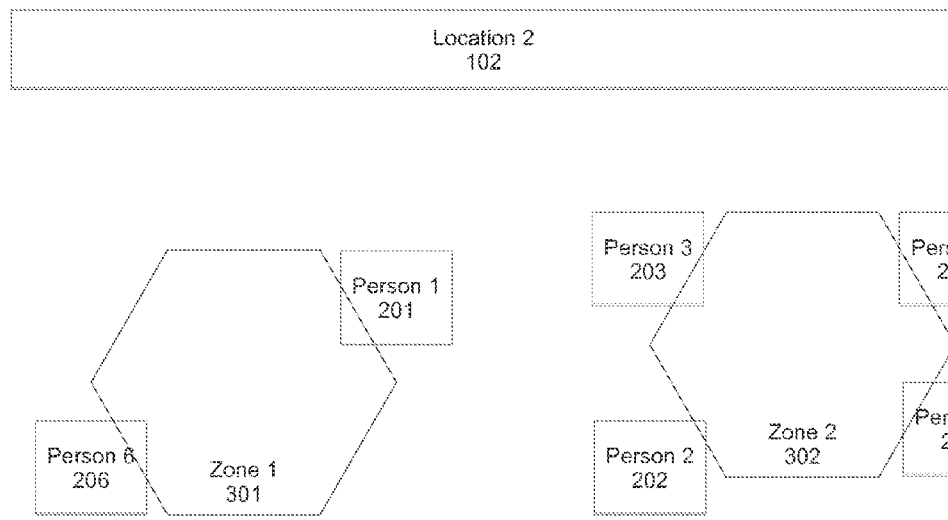

Turning to FIG. 5, FIG. 5 is a diagram representing two embodiments of sub-zones (indicated as zones within a specific location exemplary of a series of tables in a restaurant, as opposed to zones that encompass a specific location) and a methodology arriving at Mode and/or Function determination through a series of rules utilizing relative locations of co-locating persons with and relative to the first user. Scenarios A and B depict two tables (Zone 1 301 and Zone 2 302) at a restaurant (Location 2 102) having specific people sitting at the table. In Scenario A Person 1 201, Person 2 202, Person 3 203, and Person 4 204 are all sitting at the same table. The combination of proximity of Location 2 102 to a known home address or work address of first user and time of day are both parameters utilized by the decision engine in determining the first user Mode and therefore first user Preference. The combination of proximity of Zone 1 301 to Zone 2 302, which has co-located persons known by the first user (in this case co-workers Person 5 205 and Person 6 206) are also both parameters utilized by the decision engine in determining the first user Mode and therefore first user Preference. This is an exemplary of the decision engine utilizing at least two zones or sub-zones (particularly when adjoining) when the first user has inter-relationships with people in the at least two zones or sub-zones. The further combination of at least one additional parameter selected from time of day, proximity of the at least two zones, sub-zones, or location to a known address (particularly either the home address or work address of the first user). The preferred embodiment also utilizes the proximity of at least two people relative to first user, and the more precise proximity between the first user current precise location (as obtained from various methods known in the art for an internal GPS location within the aforementioned context of Location 2 102 in particular which sub-zone that the first user current location) and at least one second person within the same first sub-zone and at least one third person within a second sub-zone) such that the inter-relationship between the first user and the second person, and the inter-relationship between the first user and the third person are utilized to determine Mode and/or Preference. When the first sub-zone is not adjoining to the second sub-zone, the probability of the co-location persons "attending the same event" in the respective subzones within the same Location is lower than the probability of the co-location persons being at the same co-location due to other circumstances such as Location 2 102 being in close proximity to the first user's known work address. In Scenario A such as during lunch hour time of day, Person 1 201 (i.e., one of the spouses) the decision engine is likely to determine that the Mode is a personal mode particularly if this is not a fancy restaurant (i.e., not having an average menu price significantly higher than the first user personalization profile indicates as an average "normal" menu price). If this is a fancy restaurant (i.e., having an average menu price significantly higher than the first user personalization profile indicates as an average "normal" menu price), the decision engine is likely to determine that the Mode is a work mode. The combination of price differential between a normal meal menu price for the first user, based on either first user historic data or general consumer data, and the menu price for the current location restaurant and time of day is a critical component in determining the probability of Mode being in either a personal or work category. The combination of price differential between a normal meal menu price for the first user, based on either first user historic data or general consumer data, and the menu price for the current location restaurant and distance from a known address of either a home address or work address of the first user is a critical component in determining the probability of Mode being in either a personal or work category. The combination of distance between the current location of the first user and the known address of the first user of either home address or work address, and time of day is a critical component in determining the probability of Mode being in either a personal or work category. In Scenario B Person 1 201 (first user) and Person 6 206 (a co-worker) and Person 2 202, Person 3 203, Person 4 204, and Person 5 205 are all sitting at the same table. The decision engine has a series of at least one rule that utilizes parameters including proximity between first user and the first user's spouse, proximity between first user zone and first user's spouse zone, proximity between first user and at least one of co-worker and/or zone of co-worker, or family members (particularly children, grandchildren, etc.) all indicative of a Mode being a work mode as exemplary in Scenario B.

Figure 6:
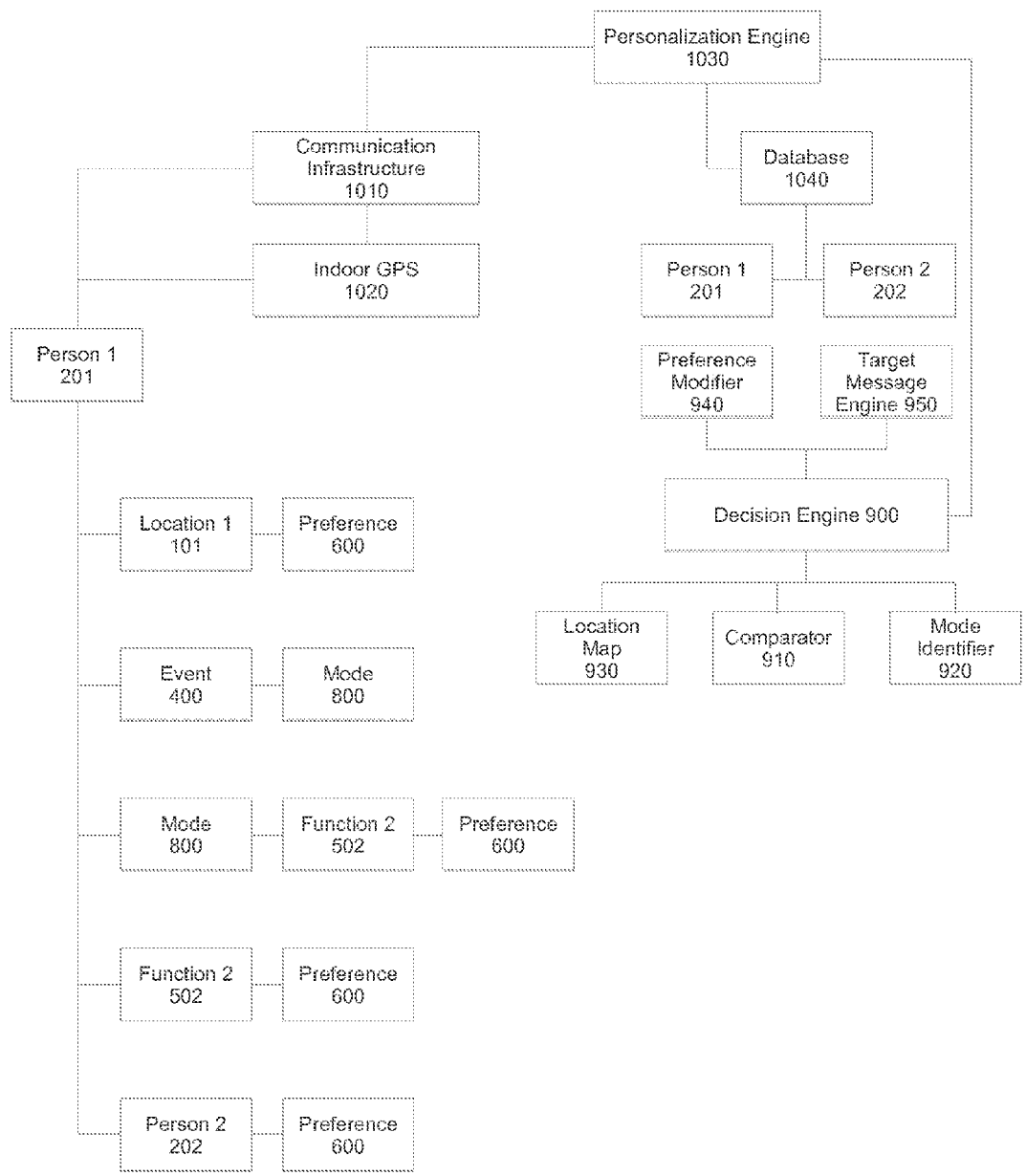
FIG. 6 is a diagram depicting the interaction of the personalization engine and the decision engine.

Turning to FIG. 6, FIG. 6 depicts a combined diagram depicting data structure based around the first user (Person 1 201), and inter-relationship of decision engine 900 core components. The data structure is an object oriented structure comprised of data objects of class/type ranging from location, event, mode, function, and people (it is understood that people and person are used as synonymous with each other).

Beginning from the top and starting at Person 1 201 (as shown in upper left hand corner) is a child relationship with the 1) Person 1 201>>Location 1 101>>Preference 600 object representing first user at a location address having preferences as contained in the instance of object type Preference; 2) Person 1 201>>Event 400>>Mode 800 represents first user at a scheduled event type/class indicating an instance of mode; 3) Person 1 201>>Mode 800>>Function 2 502>>Preference 600 represents first user having a known mode and a known function indicating a set of known preferences; 4) Person 1 201>>Function 2 502>>Preference 600 represents for first user having a known function indicating a set of known preferences; and 5) Person 1 201>>Person 2 202>>Preference 600 representing first user co-located with a second person (i.e., spouse) indicating a known set of preferences. The Decision Engine 900 itself is comprised of a user database containing objects as depicted in the aforementioned paragraphs, a method as known in the art of determining a precise location (particularly when indoors by use of devices within the category of indoor GPS 1020) and communications between the indoor GPS 1020 through a Communication Infrastructure 1010 as known in the art (can be either wired, wireless or combination of the two such as short-range wireless with a wired backbone) such that the specific precise location of the first user (and other people, particularly co-located people having a relationship with the first user) to the Personalization Engine 1030 and/or Decision Engine 900. The Personalization Engine 1030 is comprised of preferably an object oriented Database 1040 (or more specifically preferred an object oriented database having the best features of a relational database as known in the art) containing personal preferences of the first user. The Database 1040 also contains additional people having an inter-relationship with the first user such that instances of people are preferably of people objects having specific types ranging from spouse, children, grandchildren, co-workers, etc. The Decision Engine 900 is also comprised of components enabling preferences to be both obtained for at least one person including first user and inter-related people to that first user, modify and/or add preferences as they become known whether through direct user input, automated input by way of historic or current transactions (i.e., purchases) or through system intelligence (such as rule based knowledge) to determine conflicts amongst set of historic preferences that either are redundant or fail to increase the accuracy in predicting mode and/or preference. The Decision Engine 900 has additional database structures, rules based knowledge base, and processing logic enabling a Target Message Engine 950 to generate a signal (such as audio, text, or graphical) as a method of communicating to the first user. Additional important information to the Decision Engine 900 includes at least one Location Map 930, which preferably includes the current location, zones and sub-zones within the current location as well as graphical (whether 2D or 3D) components that enable either end-users or location representatives to view, alter, or determine position of first user (and other co-located people) in terms of zone, sub-zone, and particularly proximity (and vector) between people. The Location Map 930 also contains a database that is also preferably structured in an object oriented manner such that mode and/or preferences are easily and readily made available to staff people serving people (i.e., clients) located within the current location. The Decision Engine 900 further contains both a Comparator 910 and Mode Identifier 920 operable to add, modify, or remove transactions that are indicative of determining preferences, modes, functions, and/or events.

It is further understood that knowledge of mode and/or preferences amongst people co-located within a specific location (zone, sub-zone, or encompassing zone) enables planned/instantaneous interactions ranging from individually directed interactions, group interactions, or sub-group interactions. Such interactions can range from utilizing common modes and/or preferences to determine placement of individual users/co-located in terms of zones, sub-zones and potentially even seats within the zones or sub-zones. Additional interactions can include dynamic pricing to encourage specific purchase transactions to take place, particularly including encouragement of either formal group purchasing or informal (i.e., no collective knowledge of concurrent grouping) grouping of purchases. This is of particular importance in restaurant eating where staffing costs (i.e., personnel salaries) can represent on the order of 30% of the restaurants operating costs, thus the ability to make multiple orders concurrently of the same dish can significantly reduce the average time spent by staff in that specific item preparation. Significantly, the average time required to provide the purchased item to the client (i.e., first user, or co-located people) quicker that also enables faster throughput of people through the restaurant, which is also of significant importance particularly during peak periods of operation.

The decision engine's ability to accurately determine mode and/or preferences is largely determined by the ability of engine to build and "assign" specific transactions not only to the appropriate zone or sub-zone but preferably to specific people even if the individual co-located people are not directly interacting via active communication to the decision engine through a device as known in the art (e.g., smart phone, feature phone, thin client phone, thin client tablet/PC, etc.).

It is understood that Preference Category in particular has the ability to indicate specific preferences that are strong preferences indicated by parametric value of Prefer, or simply weak preferences indicated by parametric value of Include, or strong avoidance preferences indicated by parametric value of Exclude. It is further understood that numerical ranking is also anticipated as an optional scale whereas the higher positive numbers are prioritized "include" preferences and whereas the higher negative numbers are prioritized "exclude"/avoid preferences. Furthermore, it is understood that preferences change as a result of who is co-located with the first user particularly when the co-located person is a child or a spouse where the art of compromise often overwhelms the first user's personal preference. Specifically the art of compromise is further extended when the first user is sharing (such as a food dish) with a co-located person with whom that co-located person's preference(s) influences the selection by the first user. Another important activity for the decision engine deals with travel times, again where co-located persons influence travel speed whether the mode of transportation is driving to walking. The travel time can be further defined as a function of time, such as travel time particularly walking to work could be statistically faster than walking from work. The time domain is preferably defined by a particularly Precise time, a particular Zone (range of start time to end time), or a currently indeterminate time as depicted by tbd. The location domain can also be preferably defined by a particularly Precise zone, a particular Zone (range of start time to end time), or a currently indeterminate zone (i.e., geofence) as depicted by tbd.

Being away from work, doesn't mean that user is not in work mode. Being close to home, doesn't mean that user is in home mode. Being at work with family member doesn't mean user is in work mode. Being at department store and user being male and 35 years old, doesn't mean user is seeking to purchase something for himself.

Another feature of the invention is utilizing specific purchase activities, though initiated by a first known user profile, to allocate the specific purchase activity to a second user profile with a known relationship to the first known user profile. The likelihood of to whom that second user profile belongs to can be determined by a range of secondary known facts. These secondary known facts can include: a) who is co-located with the first known user profile, b) what known event is the first known user profile in the process of attending and who is co-located at the known event, c) what known event is to take place in the near future (e.g., as defined by anniversary, birthday, sporting event, etc.) for which a probability of assignment can take place.

The specific purchase activity can be preliminarily designated to at least one second user profile and include a projected/estimated designation probability to each of the at least one second user profiles. The decision engine can utilize the combination of known profile or historical activity of the second user profile to adjust the probability of assignment for such purchase activity.

It is recognized that purchase activity is variable in accordance to a wide number of parameters and/or scenarios. Some exemplars include:
 a) seasonal changes in home address (i.e., snow-birds)
 b) age changes (i.e., sibling or child changing from baby to teen ager, young adult, to mature adult)
 c) co-locating people (i.e., co-workers, siblings, friends, wife, children)
 d) proximity to known locations (i.e., place of work, hotel during work trip, hotel during family vacation, home, transportation hub)
 e) time until next scheduled event
 f) time until next scheduled event vs. projected time to reach location of scheduled event Yet another method of determining mode for a particular current location particularly when not in a location in close proximity to either the first user's known work address or home address is a categorization parameter for the current location to then compare using a comparator engine to known location category preferences in proximity to the known work address versus the known home address. An equivalent categorization of the current location to either known work address or home address (particularly when such equivalent categorization doesn't exist in the other) greatly increases the probability of the first user mode being in which the category matches the work or home address. It is recognized that historical frequency for a categorization of equivalent or in close approximation of current location is an important factor to improve the accuracy of mode determination, and/or preference determination.

Yet one other method of determining mode for a particular current location is the distance between a planned event within a time-frame from current time until such a planned event. Another important factor in determining mode is additional persons co-located at such planned event. When co-locating persons are not known in advance at the planned event, the current location (or preferably the real-time routing) of a second user/person having an inter-relationship whether co-worker or family has the means of increasing the probability of being a work or personal mode. When the planned event is a known category of event, particularly a celebration such as an anniversary, birthday, religious, or holiday, the means of increasing the probability of being a work or personal mode is available.

It is understood in this invention that a combination of scenarios can be assembled through the use of additional database records, object components, and a wide range of known parameters specifically associated with the user function.

Although the invention has been described in detail with particular reference to certain embodiments detailed herein, other embodiments can achieve the same results. Variations and modifications of the present invention will be obvious to those skilled in the art and the present invention is intended to cover in the appended claims all such modifications and equivalents.

What is claimed:

1. A decision engine comprising a first user, the first user having a user personalization profile and a first user current location, wherein the first user has an at least one sub-segment location further comprised of a location segmented profile as a child of the at least one sub-segment location, wherein the first user personalization profile has at least one sub-segment within the first user personalization profile that is a function of at least one sub-segment location including a home address or a work address, and wherein the first user personalization profile is a function of the combination of the first user current location distance to the at least one sub-segment location of the first user personalization profile.

2. The decision engine according to claim 1 wherein the first user personalization profile has an at least one sub-segment mode further comprised of a mode segmented profile as a child of the at least one sub-segment mode, wherein the at least one sub-segment mode within the first user personalization profile is a function of the segmented first user personalization profile, and wherein the at least one sub-segment mode is determined by having a mode probability as a function of a current distance between the current location and the at least one second location.

3. The decision engine according to claim 2 wherein the at least one sub-segment location has at least one geofence and whereby the at least one geofence is included or excluded in the mode probability as a function of the at least one sub-segment mode.

4. The decision engine according to claim 1 further comprised of a database having an occurrence frequency for an instance of the first user the first user current location, and a first user mode of the first user personalization profile having a mode probability as a function of the occurrence frequency at the first user current location.

5. The decision engine according to claim 1 further comprised of a database having a time-of-day probability for the at least one sub-segment location wherein the first user personalization profile mode probability is further a function of the time-of-day probability at the current location.

6. The decision engine according to claim 1 further comprised of a at least one sub-segment mode, a database having a scheduled event, and wherein the the at least one sub-segment mode probability is further a function of the scheduled event.

7. The decision engine according to claim 1 further comprised of a at least one sub-segment mode, a database having a activity function type, and wherein the at least one sub-segment mode probability is further a function of the activity function type.

8. The decision engine according to claim 1 further comprised of a target message engine operable to generate a signal including an audio, text, or graphical signal as a method of communicating to the first user.

9. A decision engine comprising a first user, the first user having a user personalization profile and first user current location, an at least one second user having a second user current location, wherein the first user personalization profile has an at least one sub-segment location having a segmented profile as a child of the at least one sub-segment location, and wherein the user personalization profile at least sub-segment location is a function of the combination of the first user current location and the at least one second user current location.

10. The decision engine according to claim 9, wherein the first user personalization profile has an at least one sub-segment mode further comprised of a mode segmented profile as a child of the at least one sub-segment mode, and wherein the at least one sub-segment mode has a mode probability as a function of distance between the first user current location and the at least one second user current location.

11. The decision engine according to claim 9 further comprised of a first user personalization profile having an at least one sub-segment mode having a segmented profile as a child of the at least one sub-segment mode, database having a set of child relationships between the first user and the second user and wherein the mode is determined by a mode probability that is further a function of the child relationship.

12. The decision engine according to claim 11 wherein the at least one second current location has at least one geofence and whereby the at least one geofence is included or excluded in the at least one sub-segment location probability as a function of the of the first user personalization profile.

13. The decision engine according to claim 9 further comprised of an at least one sub-segment mode having a segmented profile as a child of the at least one sub-segment mode, and wherein the user personalization profile at least sub-segment mode has a database having an occurrence frequency for an instance of first user being in the least one sub-segment mode, and the at least one sub-segment mode having a probability as a function of the occurrence frequency at the least one sub-segment mode.

14. The decision engine according to claim 9 further comprised of an at least one sub-segment mode having a segmented profile as a child of the at least one sub-segment mode, and wherein the user personalization profile at least sub-segment mode has a database having a time-of-day probability for the at least sub-segment mode wherein the at least sub-segment mode probability is further a function of the time-of-day at the first user current location.

15. The decision engine according to claim 9 further comprised of a database having a scheduled event wherein the at least sub-segment mode probability is further a function of the scheduled event.

16. The decision engine according to claim 15 further comprised of a database having a activity function type wherein the at least sub-segment mode probability is further a function of the activity function type.

17. The decision engine according to claim 9 further comprised of a target message engine operable to generate a signal including an audio, text, or graphical signal as a method of communicating to the first user.

18. A decision engine comprising a first user, the first user having a user personalization profile, a database having a set of child relationships between the first user and an at least one second user, a database of scheduled events in which the at least one second user is currently attending the scheduled events, an at least one sub-segment mode having a segmented profile as a child of the at least one sub-segment mode having a mode probability for the at least one sub-segment mode wherein the at least one sub-segment mode is a function of the first user, the child relationship between the first user and the at least one second user, and the scheduled event in which at least one of the second user is attending.

19. The decision engine according to claim 18 further comprised of a database having an activity function type wherein the at least one sub-segment mode probability is further a function of the activity function type.

20. The decision engine according to claim 18 further comprised of a target message engine operable to generate a signal including an audio, text, or graphical signal as a method of communicating to at least one of the first user or the at least one second user.

* * * * *